(No Model.) 8 Sheets—Sheet 1.
J. A. TATRO.
MACHINE FOR MAKING WIRE FENCING BANDS.
No. 485,723. Patented Nov. 8, 1892.
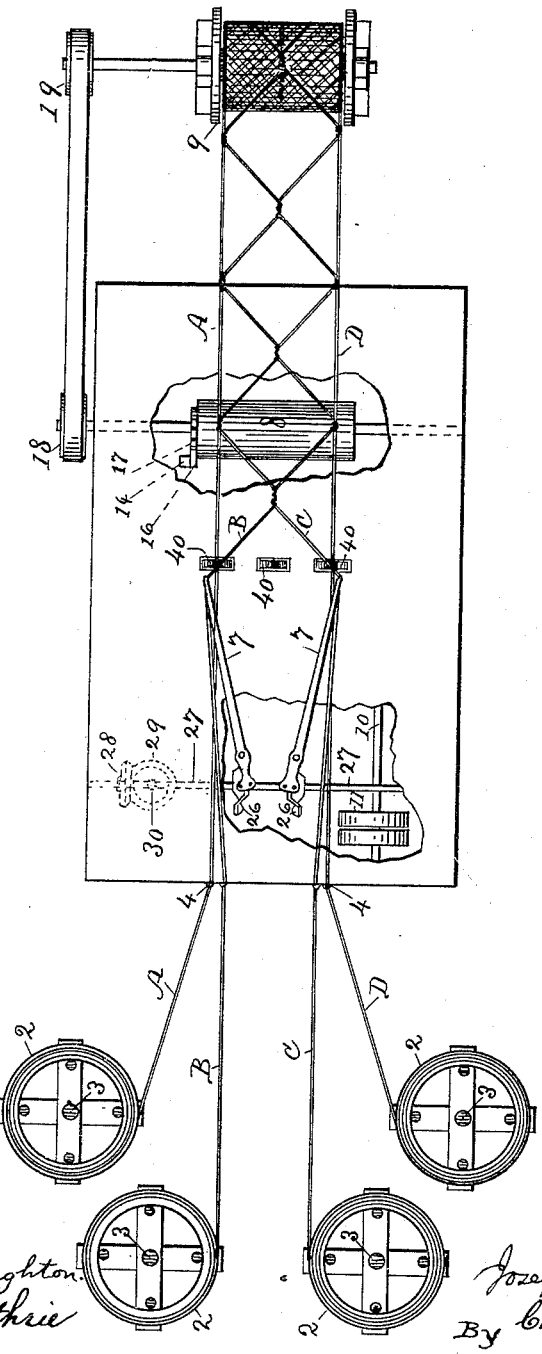
Fig. I.
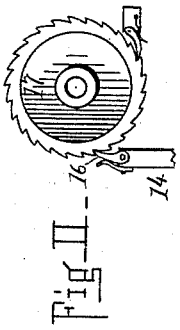
Fig. II.
WITNESSES
Thos Houghton
Edwin Guthrie
INVENTOR
Joseph A. Tatro,
By Chas. F. Benjamin
His. Atty.
THE NORRIS PETERS CO., PHOTO-LITHO., WASHINGTON, D. C.

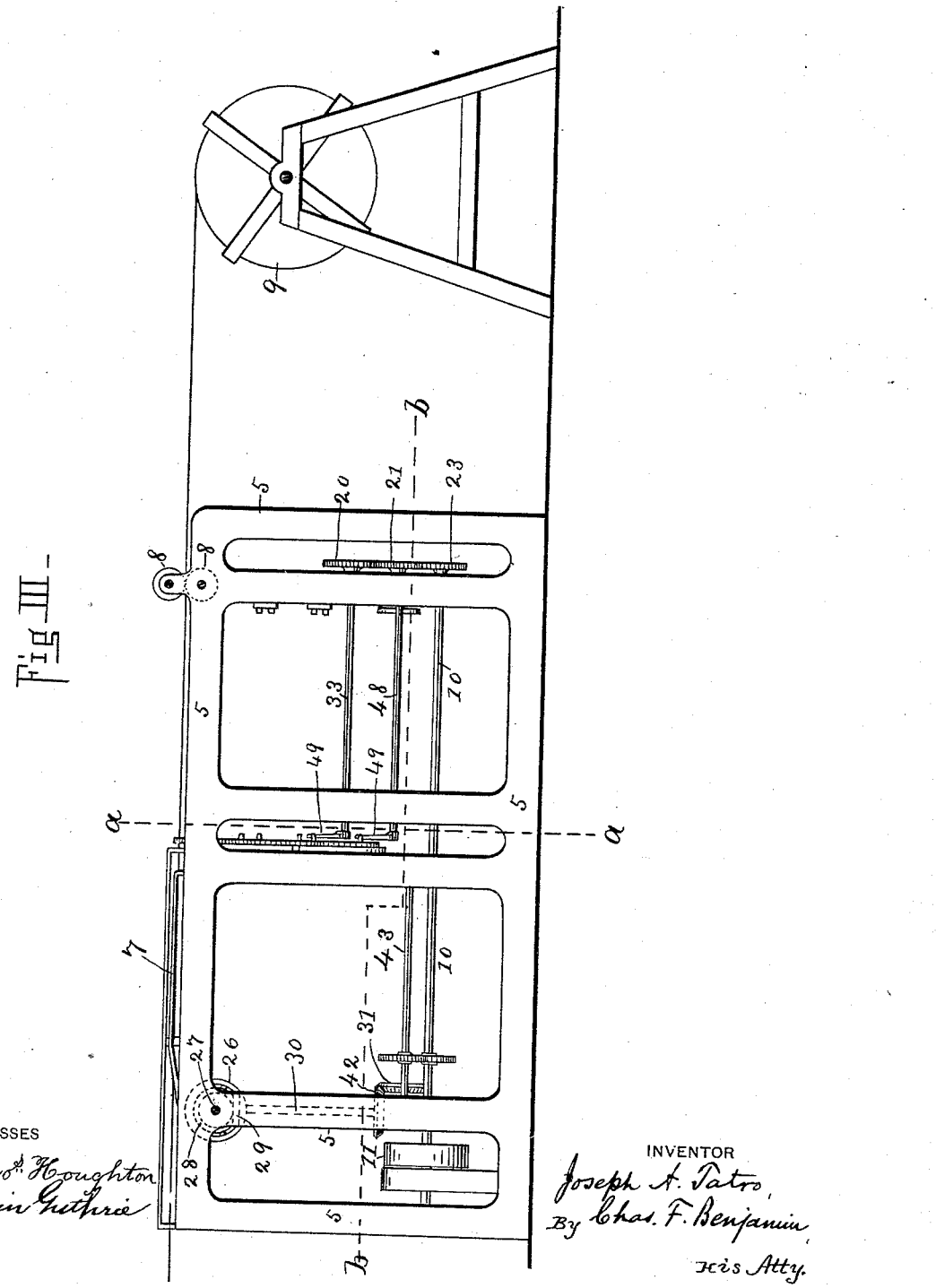

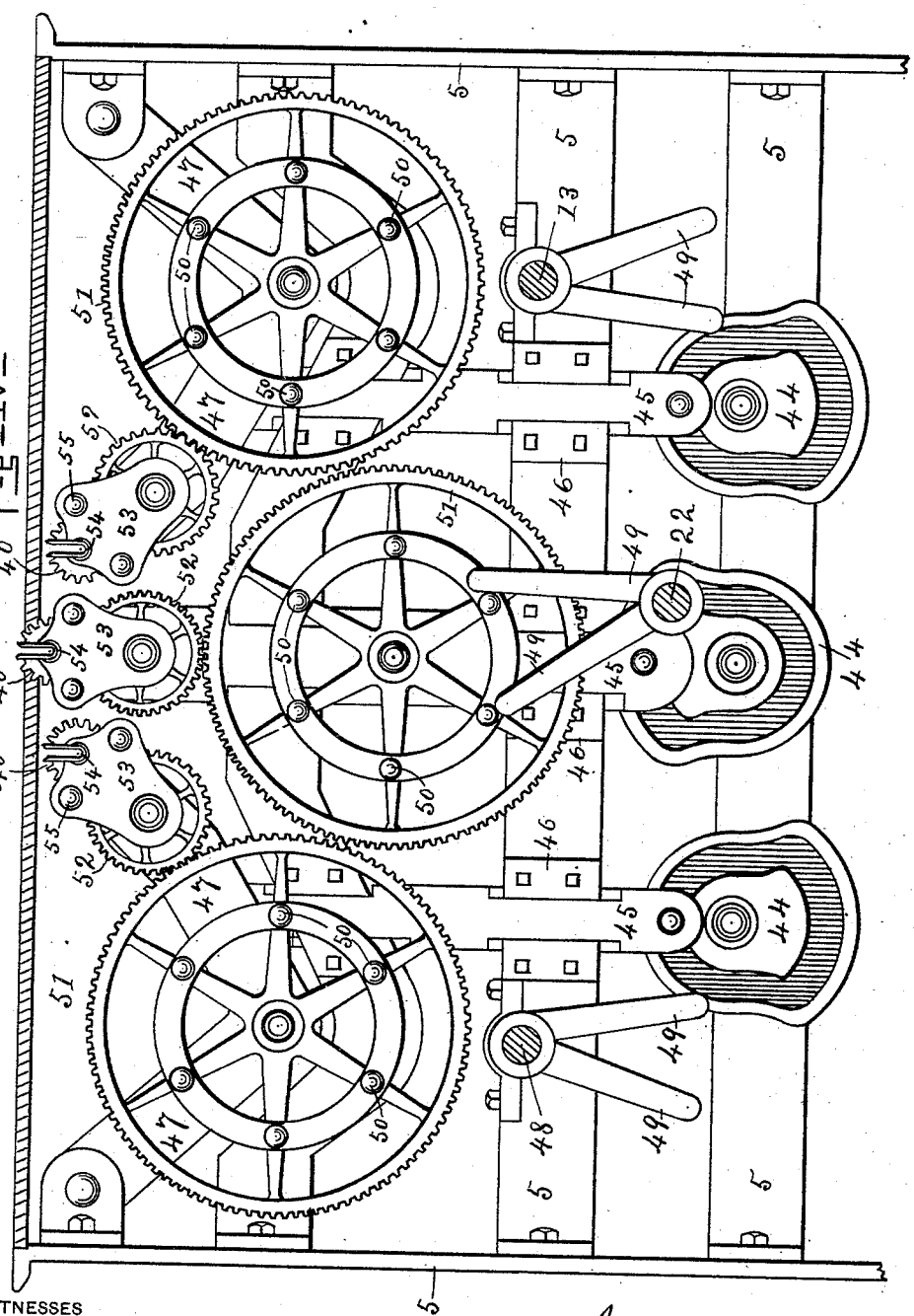

(No Model.) 8 Sheets—Sheet 4.
J. A. TATRO.
MACHINE FOR MAKING WIRE FENCING BANDS.
No. 485,723. Patented Nov. 8, 1892.
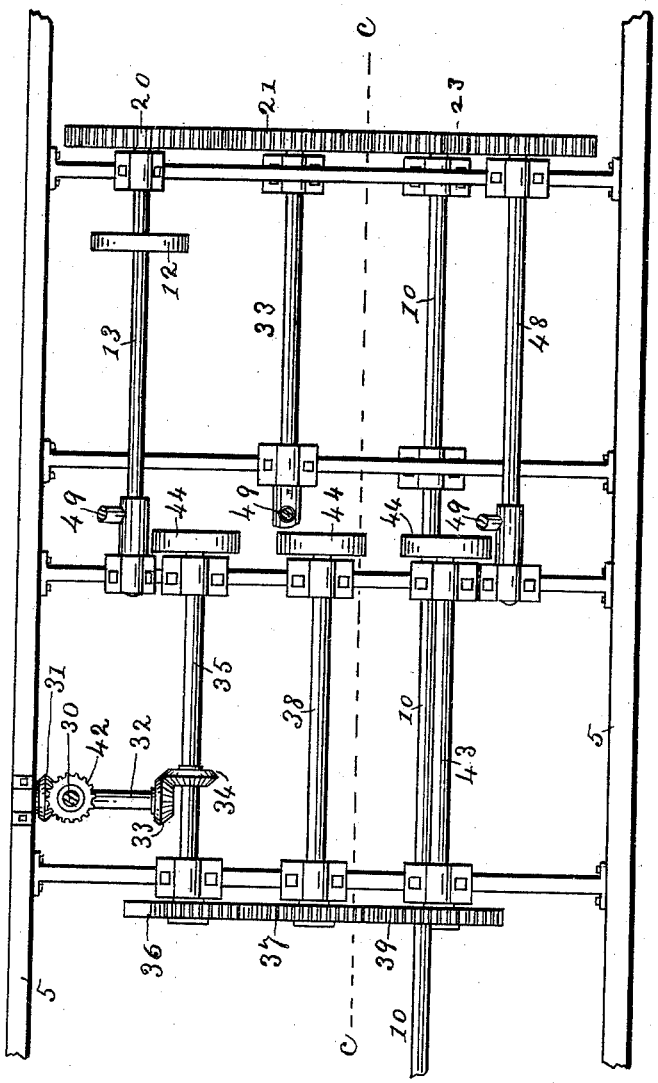
Fig. V.
WITNESSES
Thos. Houghton.
Edwin Guthrie
INVENTOR
Joseph A. Tatro,
By Chas. F. Benjamin
His Atty.

(No Model.) 8 Sheets—Sheet 5.
J. A. TATRO.
MACHINE FOR MAKING WIRE FENCING BANDS.
No. 485,723. Patented Nov. 8, 1892.
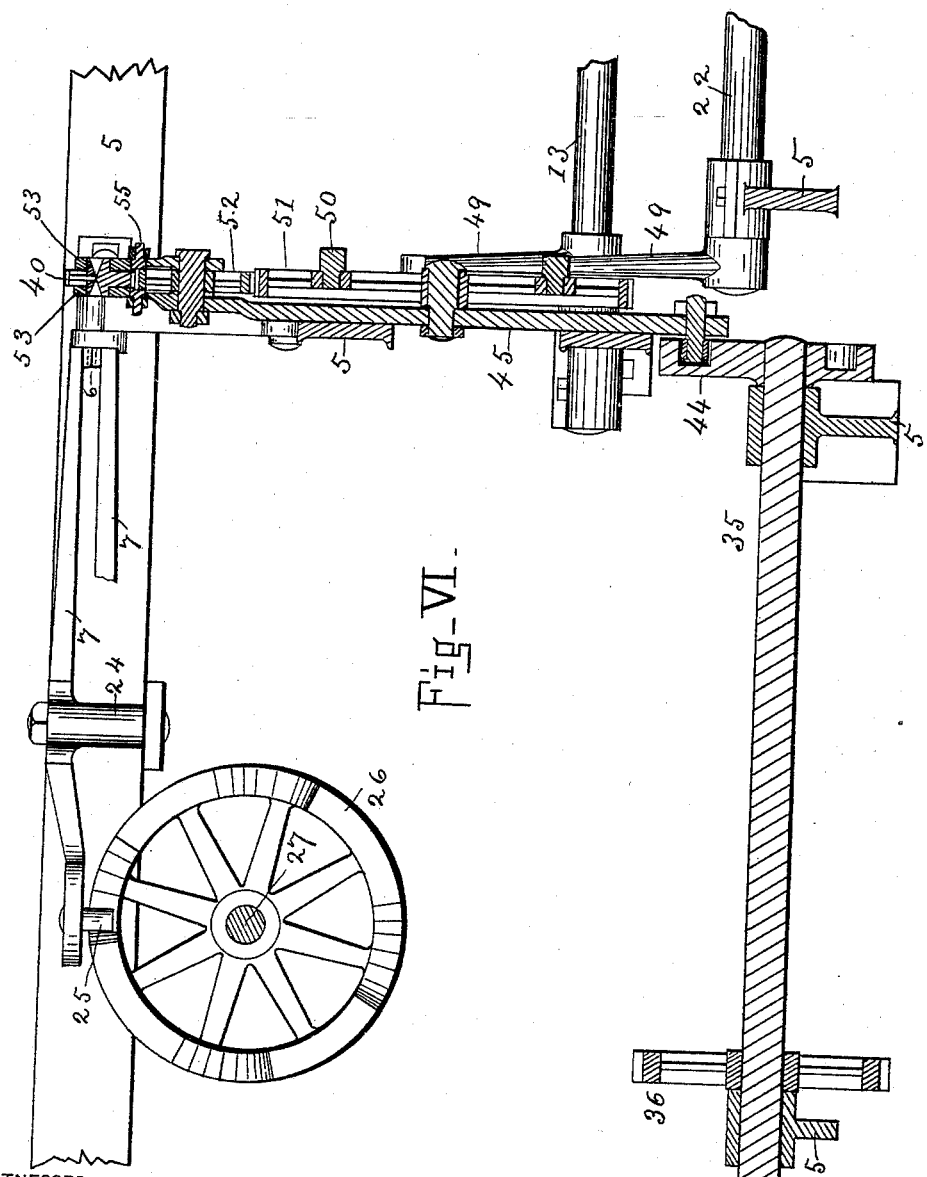
Fig. VI.
WITNESSES
Thos. Houghton.
Edwin Guthrie
INVENTOR
Joseph A. Tatro,
By Chas. F. Benjamin
His Atty.

(No Model.) 8 Sheets—Sheet 6.
J. A. TATRO.
MACHINE FOR MAKING WIRE FENCING BANDS.
No. 485,723. Patented Nov. 8, 1892.
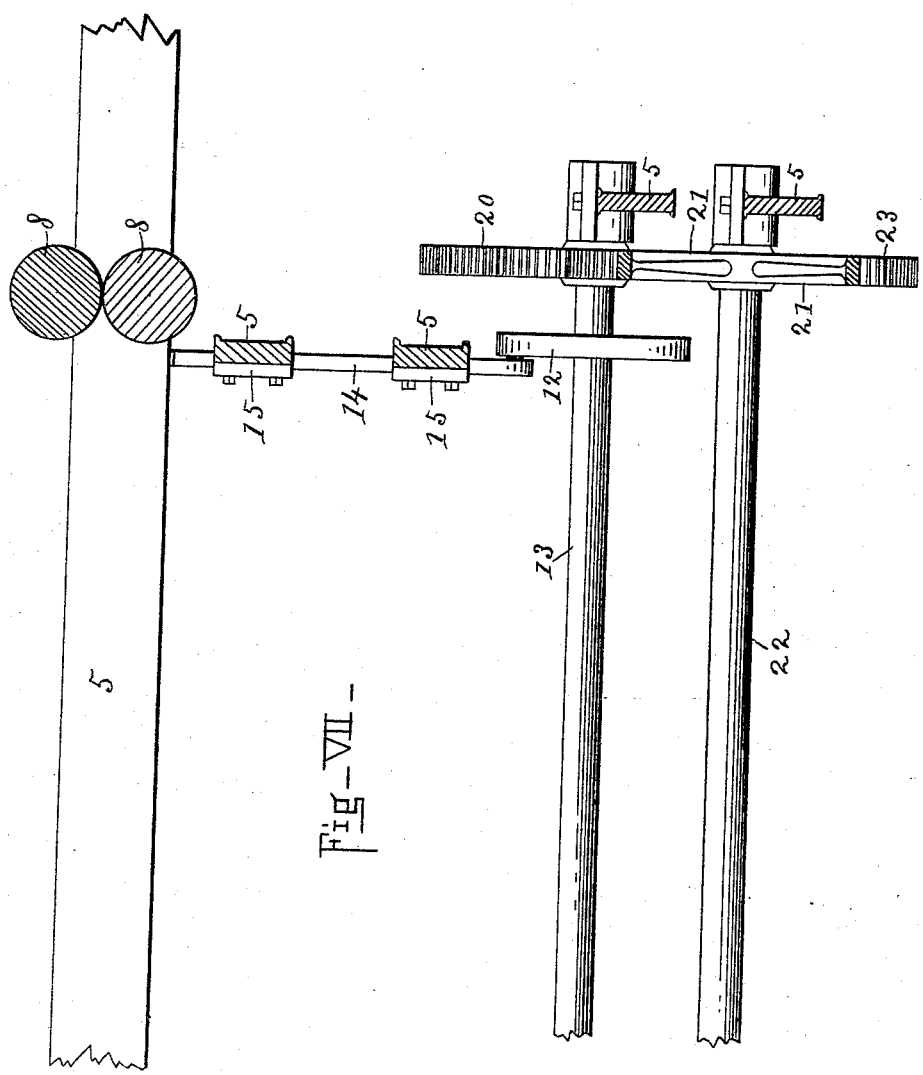

(No Model.) 8 Sheets—Sheet 7.
J. A. TATRO.
MACHINE FOR MAKING WIRE FENCING BANDS.
No. 485,723. Patented Nov. 8, 1892.
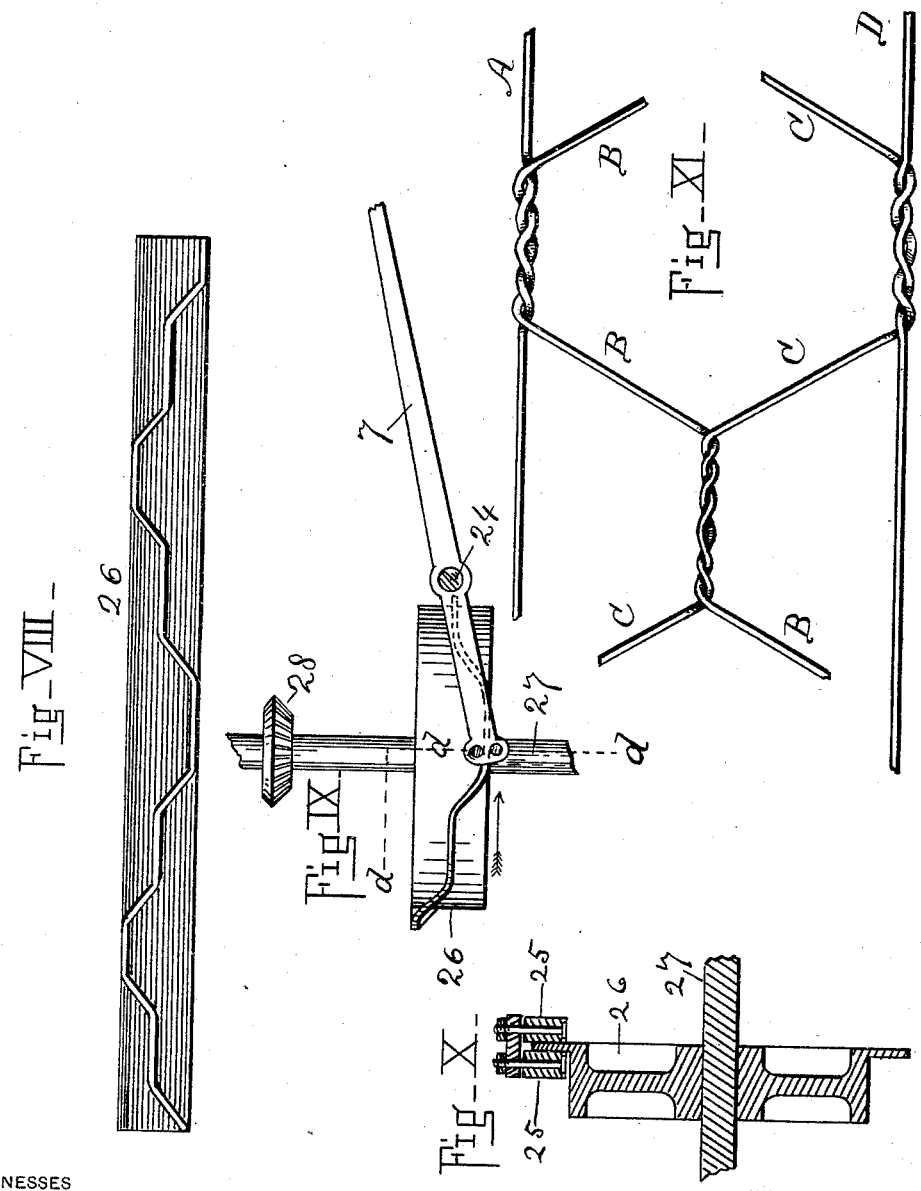

(No Model.)
8 Sheets—Sheet 8.
J. A. TATRO.
MACHINE FOR MAKING WIRE FENCING BANDS.
No. 485,723.
Patented Nov. 8, 1892.
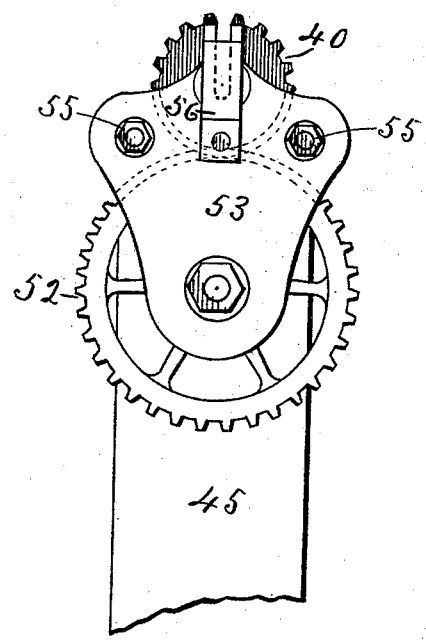
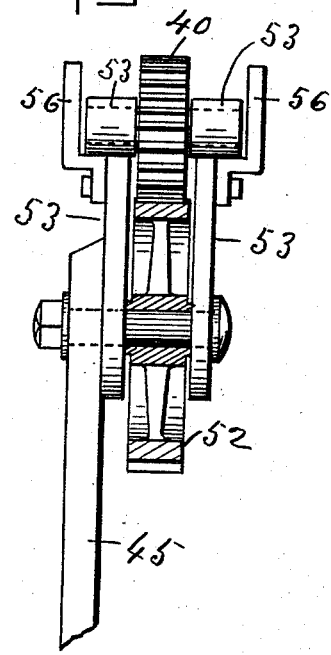
WITNESSES
Thos. Houghton.
Edwin Guthrie
INVENTOR
Joseph A. Tatro,
By Chas. F. Benjamin
His Atty.

UNITED STATES PATENT OFFICE.

JOSEPH ARNO TATRO, OF BEAVER FALLS, PENNSYLVANIA.

MACHINE FOR MAKING WIRE FENCING-BANDS.

SPECIFICATION forming part of Letters Patent No. 485,723, dated November 8, 1892.

Application filed June 23, 1892. Serial No. 437,768. (No model.)

*To all whom it may concern:*

Be it known that I, JOSEPH ARNO TATRO, a citizen of the United States, residing at Beaver Falls, in the county of Beaver and State of Pennsylvania, have invented certain new and useful Improvements in Machines for Making Wire Fencing-Bands; and I do hereby declare the following to be a full, clear, and exact description of the invention, such as will enable others skilled in the art to which it appertains to make and use the same.

The objects of this invention are to improve the construction of band fences by improving the machinery for producing the same.

It consists in a mechanism by which the lengths of wire for a band are uncoiled progressively and simultaneously from the ordinary factory-spools, spun into a fencing-band, and wound upon a shipping-spool.

In the accompanying drawings, Figure I is a top plan of my machine with parts broken away. Fig. II is an enlarged detail of the ratchet-feed for the drawing-rollers. Fig. III is a side elevation of the machine. Fig. IV is an enlarged vertical cross-section on the line $a\,a$ of Fig. III. Fig. V is a horizontal section on the line $b\,b$ of Fig. III. Fig. VI is part of a vertical section on the line $c\,c$ of Fig. V. Fig. VII is a continuation and completion of the sixth figure. Fig. VIII is a plane projection of a rim of the wheel that operates the vibrating arms which cross the wires to be spun. Fig. IX is a top view of one section of said wheel with a part of one of the pair of vibrating arms. Fig. X is a vertical section on the line $d\,d$ of Fig. IX. Fig. XI is an enlarged view showing the kind of band spun by my machine. Fig. XII is a detached front elevation of the twisting mechanism, and Fig. XIII is a detached front elevation of the same.

A, B, C, and D represent strings of wire coiled on ordinary factory-spools 2, which are mounted on suitable spindles 3 and grouped and placed in such wise that the two outer wires A and D may be conveniently drawn through guides 4 in the top of the frame 5 and the two inner wires B and C through the thimbles 6 of a pair of vibrating arms 7, mounted in the top of said frame. After passing through the thimbles the two inner wires are first twisted upon each other, forming a coil, then each of the two upon its proximate outer wire, forming another coil, then upon each other again and each upon the proper outer wire, and so alternately and continuously, all by the operation of machinery hereinafter to be described, the band thus formed being drawn between a pair of rollers 8, mounted in the frame, and finally reeled upon a shipping-spool 9, suitably mounted and placed beyond the spinning-frame.

The power is applied through a shaft 10, journaled longitudinally in the frame and rotated by a belt passing over one of the pulleys 11 near the rear end of the shaft, the other pulley being set loose upon the shaft to carry the belt when rotation of the shaft is to be suspended.

To draw the spun wire or band between the rollers 8, a cam 12 upon a shaft 13 lifts the slide 14 within its guides 15, and a pawl 16 at the top of the slide engages a ratchet-wheel 17 upon one end of the axle of the lower roller, causing that roller to move forward sufficiently with each upward stroke of the slide to carry the band forward between the rolls a distance equal to that between a center and side coil of the band. Upon the opposite end of the axle of the lower roller is a pulley 18, whereon is a belt which passes around a similar pulley 19 on the shipping-spool, whereby the completed band is wound upon the spool.

The shaft 13, through which the rollers above mentioned are operated, has on its front end a gear-wheel 20, meshing with a like wheel 21 upon a similar shaft 22, which wheel meshes with a gear-wheel 23 upon the power-shaft.

Having thus described how the wire is drawn from the feed-spools over the frame to the shipping-spool, I will next explain how the fence-band is spun during this passage.

It will be noted that the outer wires A and D follow substantially straight parallel lines from the time they enter the guides 4 till they are wound upon the shipping-spool. Assuming now that enough of the inner pair of wires has been drawn through the thimbles of the vibrating arms and rollers and upon the shipping-spool to form a selvage, the operation is as follows: After passing through the thimbles of the vibrating arms the inner wires cross each other. This is effected by the swinging inward of the vibrating arms, one of which is a little higher than the other and each of which turns upon its hub 24, pivoted to the frame. Each vibrating arm is projected rearwardly beyond the hub and has pivoted to its under surface, near its rear end, a pair of vertical rollers 25, which engage one of the two rims of a broad irregular wheel 26, the two rollers respectively bearing closely against the opposite sides of the rim. This wheel 26 has an angular outline, and the dimensions of the wheel and of its angular rims are precisely calculated in relation to the coöperating mechanism to swing the vibrating arms by means of their respective pairs of vertical rollers at the proper intervals in the right direction and for the proper distance. The wheel 26 is mounted vertically upon a horizontal shaft 27, journaled in the frame and provided with a miter-wheel 28, meshing with a miter-wheel 29 upon the vertical shaft 30, journaled in the frame. This vertical shaft has another miter-wheel 42, meshing with a miter-wheel 31 upon the horizontal shaft 32, which has another miter-wheel 33, meshing with a miter-wheel 34 upon the horizontal shaft 35, and this last-mentioned shaft has a gear-wheel 36 upon its rear end. This gear-wheel meshes with the gear-wheel 37 upon the shaft 38, and this gear-wheel meshes with a gear-wheel 39 upon the driving-shaft 10. By means of this system of shafting and gears the wheel 26 is revolved. Directly under the point where the inner wires intersect the center wheel of three wheels 40 is mounted. This wheel has a narrow vertical notch extending from its periphery to the center of its arbor. The cross-section of the walls of this notch is convex, the cross-outline tapering away from the center of each wall to the two edges thereof. The inner wires being intersected by the contemporaneous swinging inward of the vibrating arms the aforesaid center wheel is projected above the top of the frame, receives the intersected wires in the notch—one above the other—and continues its ascent till the crossed wires are at the bottom of the notch, when the wheel makes two complete revolutions, twisting the wires one upon another, after which the wheel pulls away from the strand into its position below the top of the frame. The inner wires being twisted, as just described, the intermittent rotation of the rollers 8 draws the band along the top of the frame the distance of half a mesh or from the cross-line of a center coil to that of a side coil. At the moment this movement is effected the thimble of each vibrating arm crosses the proximate outer wire. Then the outer wheels 40, which are in the same vertical cross-section as the center wheel and are similarly notched, simultaneously project above the top of the frame and twist each of the intersecting pair of wires in the manner already described and return to their places below the top of the frame. The band is drawn along another half-mesh and another inner twist effected, followed by another pair of outer twists, and so alternately while the operation lasts. I will now explain how the set of three twisting-wheels are operated. Each of the shafts 35, 38, and 43 has an eccentric cam 44 on its forward end. Pivoted to each of these cams is a slide 45, moving in guides 46, formed in or upon the frame of the machine. (See Fig. IV.) As the cams rotate the slides move up and down, and the slides are so attached to the cams that the two outer slides reach their highest point simultaneously, while at the same moment the center slide is at its lowest point. Conversely, when the two outer slides are at their lowest the center slide is at its highest reach. The middle twisting-wheel 40 is pivoted at the top of the center slide 45, and the two outer twisting-wheels are pivoted to bent levers 47, hung in the frame and operated by the outer slides. Hence, by the operation of the slides the twisting-wheels are projected through and above the top of the frame, the center wheel at the place and time required to twist the pair of inner wires one upon the other, and the two outer wheels together at the time and places necessary for each to twist together an outer and inner wire. When the middle twisting-wheel has made a twist or the pair of outer twisting-wheels have made a pair of twists, as the case may be, said wheel or pair of wheels is pulled away from the wires by the continuous rotation of the cams at the bottom of the slides. Each of the twisting-wheels 40 is mounted between the two counterparts of a housing 53, having notches 54, corresponding with the notches of the twisting-wheels, to admit the pair of crossed wires to the arbor of the twisting-wheel. As the wheel, in its housing, rises to engage the pair of crossed wires, gages 56, one bracketed to each counterpart of the housing, pass between the wires, one in front and one in rear of the point of intersection of the wires, and the space between the pair of gages determines the length of the lock or twist. The gages also afford a bearing for the wires while the revolution of the wheel is twisting them together.

For the purpose of rotating the twisting-wheels to twist the wires engaged by them, each of the shafts 13, 22, and 48 has at its rear end a fork 49, with round-tipped tines, which bear upon studs 50, arranged equidistantly upon inner rims of gear-wheels 51, whereof one is borne upon each of the slides aforementioned. Each of these wheels gears with a smaller wheel 52, whereof the center one is mounted upon the center slide and the two others, respectively, upon the bent levers already mentioned. These small wheels 52 gear, respectively, with the twisting-wheels 40, and the relations and proportions of the mechanical parts connected with the reciprocating and rotating motions of the twisting-wheels may be calculated and arranged to give any desired number of revolutions to the twisting-wheels, not less than one or a multiple of one, and so that the notch in each twisting-wheel be upward at the moment of contact with or withdrawal from its pair of intersecting wires. The forms of the cams 44 may be varied, to retain the twisting-wheels a longer or shorter time above or below the top of the frame, as desired.

As shown by the drawings, the shafts 13, 22, and 48 are geared together, and so are the shafts 35, 38, and 43, and each system of shafting is rotated by the common driving-shaft 10, which operates the rollers 8, the wheel 26, and the twisting-wheels 40, each and all at the time, in the manner, and for such duration as is necessary to harmonize the working and result of the entire mechanical construction.

In lieu of the pair of rollers 25, at the rear end of each vibrating arm 7, I may use a single roller or a point, letting it traverse a channel cut in the rim of the wheel 26 that swings the vibrating arms.

Having thus described my invention, I claim as follows:

1. The combination, in a machine for making band fencing, of the cam 12, mounted on a rotary shaft, the slide moving in vertical guides above the cam and having a pawl at its top, and the pair of rollers mounted one over the other above the slide and the lower provided with a fixed ratchet-wheel in gear with the pawl, all substantially as to construction and arrangement in the manner described, for the purpose of drawing the fence-band between said pair of rollers at regular intermissions of time and by uniform lengths of banding.

2. The combination, in a machine for making band fencing, of the pair of vibrating arms having each an open-tipped thimble at the front end and provided with the hubs at their points of support and with the vertical rollers in pairs at the rear ends, and the cam-shaped wheel mounted upon a rotary shaft and having the rims on its periphery in contact with the rollers of the vibrating arms, said arms and wheel being supported in the framework of the machine, and the whole constructed and arranged substantially as set forth, for the purpose of alternately swinging said arms inwardly and outwardly at regular intervals of time and for uniform distances, as herein fully described.

3. The combination, in a machine for making band fencing, of the twisting-wheels mounted on rotary shafts having each a straight notch from the edge to the arbor of the wheel, the gear-wheels in pairs beneath said twisting-wheels and meshing therewith, the studs at regular intervals around the faces of the lower gear-wheels, the forks below said lower gear-wheels in intermittent contact with the said studs and mounted on rotary shafts, the shafts of the said twisting-wheels and gear-wheels being supported in proper positions within the framework of the machine, the whole substantially as set forth herein, for the purpose of revolving the said twisting-wheels in the spinning of the wire, as herein fully described.

4. The combination, in a machine for making band fencing, of the cams 44, mounted on rotary shafts carried in the framework of the machine, the slides pivoted to said cams, the center slide moving in guides in the aforesaid framework, the bent levers pivoted at one end to the said framework and also pivotally connected to the outer two of the slides aforesaid, and the twisting-wheels mounted one at the top of the center slide and the two others at the free ends of the bent levers, the whole constructed and arranged substantially as described, for the purpose of projecting said twisting-wheels above the top of the frame whenever required in the operation of the machine, as fully set forth herein.

5. The combination, in a machine for making band fencing, of the cams 44, mounted on rotary shafts supported in the frame of the machine, the reciprocating slides pivoted to said cams, the center slide moving in guides in the framework of the machine, the bent levers hung by one end in the frame of the machine and pivoted to the outer of the aforesaid slides, the set of large toothed wheels upon the center slide and the two bent levers having the circle of studs upon each wheel, the forks mounted on rotary shafts supported in the frame of the machine, the said forks in intermittent contact with the aforesaid studs, the toothed wheels upon said center slide, and bent levers in gear with the studded wheels, and the twisting-wheels upon the center slide and bent levers in gear with the last-mentioned toothed wheels, all substantially in the manner herein set forth, for the purpose of revolving said twisting-wheels and projecting them at intervals above the top of the framework of the machine, as herein fully described.

6. The combination, in a machine for making band fencing, of the twisting-wheel mounted upon a reciprocating movable support and having a straight notch formed from the rim to the arbor of said wheel, with the housing mounted on the same support and formed in two counterparts arranged on either side of the twisting-wheel, each counterpart having the gage projected from and above said counterpart, all in the manner described, for the purpose of fixing the length of a lock or twist in the fencing-band and affording bearings for the material during the formation of a twist, as fully set forth herein.

In testimony whereof I have affixed my signature in presence of two witnesses.

JOSEPH ARNO TATRO.

Witnesses:
  JNO. W. CULMER,
  C. R. WYLIE.